3,272,810
α-CYANO-β,β-DIPHENYLACRYLAMIDE
COMPOUNDS
Albert F. Strobel, Delmar, and Sigmund C. Catino,
Castleton, N.Y., assignors to General Aniline &
Film Corporation, New York, N.Y., a corporation
of Delaware
No Drawing. Filed May 1, 1962, Ser. No. 191,459
7 Claims. (Cl. 260—247.1)

This invention relates to new and useful compounds which impart to organic materials superior resistance to degradation and deterioration when they are exposed to actinic radiation, and in particular to ultra-violet radiation. This application is a continuation-in-part of application Serial No. 788,529, filed Jan. 23, 1959, and now abandoned. This invention further relates to processes for the preparation of new and useful compounds of the type hereinbefore described. The compounds with which this invention is concerned are characterized as α-cyano-β,β-diphenylacrylic acid substituted amide derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining α-cyano-β-β-diphenylacrylic acid substituted amide derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulation such as a paint film or a dyed textile. Many of the compounds of this invention also absorb some visible light on the violet end of the spectrum which renders them particularly useful in many formulations which are susceptible to visible light degradation. Thus polypropylene cellulose nitrate and polyvinyl chloride are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such epoxys' melamines and the like. While the compounds of the present invention do dot require an hydroxyl group, the presence thereof is not a disadvantage, or detriment where alkaline sensitivity is no problem.

It is therefore an object of the present invention to provide new and useful compounds characterized by outstanding ultra-violet absorbing properties.

It is still another object of this invention to provide new and useful α-cyano-β,β-diphenylacrylic acid substituted amide derivatives which are outstanding ultra-violet absorbing compounds.

It is a still further object of the present invention to provide processes for the preparation of new and useful ultra-violet absorbing compounds.

It is a still further object of the present invention to provide processes for the preparation of new and useful ultra-violet absorbing compounds which are substituted amide derivatives of α-cyano-β,β-diphenylacrylic acid.

Other objects will appear hereinafter as the description proceeds.

The α-cyano-β,β-diphenylacrylic acid substituted amide derivatives which are contemplated in this invention are devoid of nitro groups and are characterized by the following general formula:

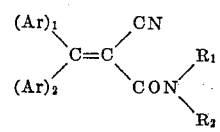

wherein $(Ar)_1$ and $(Ar)_2$ represent aromatic carbocyclic nuclei devoid of nuclear bonded amino groups $R_1$ and $R_2$ may be independently alkyl, alkenyl, substituted alkyl or alkenyl or the atoms to complete a heterocyclic ring with the amide nitrogen atom.

The following specific substitutes for $R_1$, $R_2$ or $R_1$ and $R_2$ together may be employed.

methyl
ethyl
n-propyl
iso-propyl
n-butyl
iso-butyl
tertiary-butyl
secondary-butyl
n-amyl
iso-amyl
tertiary-amyl and the other isomeric amyls
n-hexyl iso-hexyl and the other isomeric hexyls
n-heptyl
iso-heptyl and the other isomeric heptyls
n-primary nonyl (nonyl-1)
    nonyl-(2)
    nonyl-(3)
    nonyl-(5)
2-methyl-octyl-2
4-ethyl-heptyl-4
2-methyl-4-ethyl-hexyl-4
n-primary octyl
    octyl-(2) (capyryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-primary decyl (decyl-1)
decyl-4 (secondary decyl)
2-ethyl-octyl-3 (tertiary decyl)
4-propyl-heptyl-4 (tertiary decyl)
undecyl-1 (n-primary decyl)
undecyl-2 (n-secondary decyl)
dodecyl-1 (n-dodecyl)
tridecyl-1 (n-tridecyl)
tridecyl-7
3-ethyl-undecyl
tetradecyl-1 (n-tetradecyl)
pentadecyl-1 (n-pentadecyl)
pentadecyl-8
hexadecyl (cetyl)
heptadecyl-9
octadecyl-1
2-methyl heptadecyl-2
eicosyl-1
docosyl-1
tricosyl-12
tetracosyl
tricapryl
pentacosyl
hexacosyl
heptacosyl
octacosyl
nonacosyl
myrisyl (30 carbons)
alkenyl
allyl ($CH_2=CHCH_2-$)
methallyl ($CH_2=C(CH_3)CH_2-$)
crotyl ($CH_3CH=CHCH_2-$)
butenyl-1 ($CH_2=CHCH_3-$)
pentenyl-1
γ-isopropyl allyl
β-ethyl-γ-propyl allyl
2-methyl-octenyl-6
decenyl-1
decenyl-2
undecenyl
dodecenyl-2
octadenyl
docosenyl
pentamethyl eicosenyl
cyanoethyl
cyanopropyl (n)
cyanoisopropyl
cyanobutyl (n)
cyanoisobutyl
cyanoamyl (n)
cyanoisoamyl
cyanohexyl
cyanoheptyl
cyanononyl
cyanodecyl
cyanolauryl, and the like hydroxyethyl
hydroxypropyl (n-propyl, isopropyl)
hydroxybutyl (n-butyl, isobutyl, etc.)
hydroxyamyl
hydroxyhexyl
hydroxydecyl
hydroxylauryl, and the like
chloroethyl
chloropropyl (n-propyl, isopropyl)
chlorobutyl (n-butyl, isobutyl, etc.)
chloroamyl
chlorohexyl
chlorodecyl
chlorolauryl, and the like
bromoethyl
bromopropyl (n-propyl, isopropyl)
bromobutyl (n-butyl, isobutyl, etc.)
bromoamyl
bromohexyl
bromodecyl
bromolauryl, and the like
methoxyethyl
methoxypropyl (n-propyl, isopropyl)
methoxybutyl (n-butyl, isobutyl, etc.)
methoxyamyl
methoxyhexyl
methoxydecyl
methoxylauryl, and the like
ethoxyethyl
ethoxypropyl (n-propyl, isopropyl)
ethoxybutyl (n-butyl, isobutyl, etc.)
ethoxyamyl
ethoxyhexyl
ethoxydecyl
ethoxylauryl, and the like
carbomethoxy ethyl
carbomethoxy propyl
carbomethoxy butyl
carbomethoxy amyl
carbomethoxy hexyl, etc.
carbethoxyethyl
carbethoxypropyl
carbethoxybutyl
carbethoxyamyl
carbethoxyhexyl, etc.
carbopropoxyethyl
carbopropoxypropyl
carbopropoxybutyl
carbopropoxyamyl
carbopropoxyhexyl, etc.
carbobutoxyethyl
carbobutoxypropyl
carbobutoxybutyl
carbobutoxyamyl
carbobutoxyhexyl, etc.
furyl
terahydrofurfuryl
benzofuryl
thienyl
pyrryl
pyrollidyl
2-pyrollidonyl
indolyl
carbazolyl
oxazolyl
thiazolyl
pyrazolyl
pyridyl
pyrimidyl
quinolyl, and the various following substituents therein alkyl, alkoxy, halo, carboxy, carboxalkoxy, acyl, and acylamino The aromatic carbocyclic nuclei $(Ar)_1$ and $(Ar)_2$ are preferably phenyl or substituted phenyl but may also represent naphthyl and the like. Among the substituents which may be present in $(Ar)_1$ and $(Ar)_2$ are:

alkyl, e.g.,
   methyl
   ethyl
   n-propyl, etc.
halogen, e.g.,
   chlorine
   bromine
hydroxy
alkoxy
carboxy
carbonamide
sulfonamide
cyano
carbalkoxy
acyloxy
aryl, e.g.,
   phenyl
   tolyl
   xenyl
substituted aryl, e.g.,
   halophenyl
   alkoxyphenyl
   cyanophenyl
   acyloxyphenyl
   carboxyphenyl, etc.

Among the specific benzophenone compounds which may be employed are:

2-methylbenzophenone
3-methylbenzophenone
4-methylbenzophenone
2-chlorobenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
benzophenonecarboxylic acid(2)
benzophenonecarboxylic acid(3)
benzophenonecarboxylic acid(4)
2-benzoylbenzoic acid methyl ester
2-benzoylbenzoic acid ethyl ester
2-benzoylbenzoic acid amide
2-benzoylbenzoic acid monoethyl amide
3-benzoylbenzoic acid methyl ester
3-benzoylbenzoic acid ethyl ester
4-benzoylbenzoic acid methyl ester
4-benzoylbenzoic acid ethyl ester
2-sulfonamidebenzophenone
4-sulfonamidebenzophenone
4-ethylbenzophenone
2,4-dimethylbenzophenone
2,5-dimethylbenzophenone
3,4-dimethylbenzophenone
2,4'-dimethylbenzophenone
3,4'-dimethylbenzophenone
4,4'-dimethylbenzophenone
4-propylbenzophenone
4-isopropylbenzophenone
2,4,5-trimethylbenzophenone
2,4,6-trimethylbenzophenone
2,4,2'-trimethylbenzophenone
2,4,3'-trimethylbenzophenone
2-methyl-5-isopropylbenzophenone
2,3,4,6-tetramethylbenzophenone
2,3,5,6-tetramethylbenzophenone
2,4,2',4'-tetramethylbenzophenone
2,5,2',5'-tetramethylbenzophenone
2,4,3',4'-tetramethylbenzophenone
2,4,6,3',5'-pentamethylbenzophenone
2,2'-dimethyl-5,5'-di-isopropylbenzophenone
4-n-octylbenzophenone
4-cyclohexylbenzophenone
2-benzoylbenzophenone
4,4'-dicyclohexylbenzophenone
4,4'-di-p-toluylbenzophenone
2-phenylbenzophenone
3-phenylbenzophenone
4-phenylbenzophenone
2-propenylbenzophenone
2-allylbenzophenone
N,N-dimethyl-2-sulfonamidebenzophenone
4-phenethylbenzophenone
2-carboxamidebenzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)benzophenone
4-(p-tolyloxy)benzophenone
4-isopentyloxybenzophenone
2-acetoxybenzophenone
3-acetoxybenzophenone
4-acetoxybenzophenone
4-cyclohexyloxybenzophenone
4-benzyloxybenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone
4,4'-di-iodobenzophenone
3,5-di-iodobenzophenone
4-chloro-4'-bromobenzophenone
2,2'-di-iodobenzophenone
2,4-dichloro-2',4'-dibromobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
2-bromo-2',4,4',6,6'-pentamethylbenzophenone
2-hydroxy-5-octylbenzophenone
4-chloro-3',4'-dimethylbenzophenone
2-chloro-2',4'-dimethylbenzophenone
2'-bromo-4-methylbenzophenone
2-hydroxy-4-methylbenzophenone
4-hydroxy-2-methylbenzophenone
4-hydroxyethoxybenzophenone
3-hydroxy-4-methoxybenzophenone
2-hydroxy-4-methoxy-3-methylbenzophenone
4'-methoxy-2-methylbenzophenone
4-methoxy-3-methylbenzophenone
6-methoxy-3-methylbenzophenone
6-hydroxy-3-methylbenzophenone 4-methoxy-2-methylbenzophenone
4,4'-dimethoxybenzophenone
4,4'-diethoxybenzophenone
4,4'-di-isopropoxybenzophenone
2,2'-dimethoxybenzophenone
2,3-dimethoxybenzophenone
2,4'-dimethoxybenzophenone
4-methoxy-2,5-dimethylbenzophenone
4-hydroxy-2,5-dimethylbenzophenone
2-hydroxy-3,5-dimethylbenzophenone
5-hydroxy-2,4-dimethylbenzophenone
5-methoxy-2,4-dimethylbenzophenone
5-ethoxy-2,4-dimethylbenzophenone
4-methoxy-3-methyl-6-isopropylbenzophenone
4-hydroxy-3-methyl-6-isopropylbenzophenone
4-hydroxy-2-methyl-5-isopropylbenzophenone
4-acetoxy-2-methyl-5-isopropylbenzophenone
4-acetoxy-3-methyl-5-isopropylbenzophenone
3-ethoxy-3',4,4'-trimethoxybenzophenone
4-ethoxy-3,3',4'-trimethoxybenzophenone
4-(p-methoxyphenyl)-4'-phenylbenzophenone
4,4'-bis(p-methoxyphenoxy)benzophenone
4-(p-hydroxyphenyl)benzophenone
4-(p-methoxyphenyl)benzophenone
4-methoxy-3,5-dimethylbenzophenone
6-ethoxy-3-methylbenzophenone
3-chloro-4(2-hydroxyethoxy)benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4-fluoro-2-methylbenzophenone
4'-bromo-4-hydroxybenzophenone
4'-bromo-4-ethoxybenzophenone
3-iodo-4-methoxybenzophenone
3-iodo-4-hydroxybenzophenone
4'-iodo-4-ethoxybenzophenone
5-chloro-2-hydroxy-4-methylbenzophenone
3'-chloro-2-hydroxy-4-methylbenzophenone
3'-chloro-4-hydroxy-3-methylbenzophenone
3'-chloro-4-methoxy-3-methylbenzophenone
5'-chloro-2'-methoxy-3-methylbenzophenone
5'-iodo-2-hydroxy-3-methylbenzophenone
2'-iodo-6-hydroxy-3-methylbenzophenone
5-iodo-6-hydroxy-3-methylbenzophenone
3'-iodo-4'-methoxy-2-methylbenzophenone
3'-iodo-4'-hydroxy-2-methylbenzophenone
5'-iodo-2'-hydroxy-2-methylbenzophenone
4'-bromo-6-hydroxy-3-methylbenzophenone
2'-bromo-6-hydroxy-3-methylbenzophenone
2'-bromo-6-methoxy-3-methylbenzophenone
2-chloro-2'-bromo-4-hydroxybenzophenone
3,5-dibromo-4-hydroxybenzophenone
3,5-dibromo-4-ethoxybenzophenone
3,5-di-iodo-4-hydroxybenzophenone
3,5 - dichloro-2,2',4,6'-tetramethoxy-4'-methylbenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
4'-tertiarybutyl-2'-isopropenyl-2,3,5,6-tetramethylbenzophenone
2,2'-dihydroxy-4,4'-dipropoxybenzophenone
2,5-dimethoxy-3,4-dimethylbenzophenone
4,4'-dimethoxy-3,3'-dimethylbenzophenone
2,6-dimethoxy-2'-methylbenzophenone
2,6-dimethoxy-3'-methylbenzophenone
3,3'-diethoxy-4,4'-dimethoxybenzophenone
3,3',4,4',5,5'-hexamethoxybenzophenone
2,2'-dihydroxy-4,4'-bis(octyloxy)benzophenone
2,2'-dihydroxy-4,4'-bis(hexyloxy)benzophenone
3,3'-dimethoxy-4,4'-bis(benzyloxy)benzophenone In addition to the amides above described in the general formula, polyoxyalkylated derivatives thereof (from compounds containing at least one reactive hydrogen atom), are within the purview of this invention. Thus hydroxyl, amide, sulfonamide and the like groups may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like, to yield the corresponding polyoxylakylated product. From 1 to about 200 moles of alkylene oxide may be added.

The general method for preparing the compounds of this invention involves a condensation of the phenone compound with the selected cyanoacetamide in a suitable solvent or under such conditions that dehydration occurs to form the acrylic acid derivative. A preferred catalyst for the condensation is ammonium ions in strong acid (e.g., glacial acetic acid).

The following examples will serve to illustrate the present invention without being deemed limitative thereof. Parts are by weight unless otherwise indicated.

*Example 1*

Preparation of $\alpha$-cyano-$\beta,\beta$-diphenylacrylic acid N,N-dimethylamide:

Equimolar amounts of benzophenone and $\alpha$-cyano-N,N-dimethylacetamide (1 mole of each) are heated with 200 ml. of benzene, 10 grams of ammonium acetate and 40 ml. of glacial acetic acid at reflux for 10 hours. The benzene is then distilled off and the residue diluted with 500 ml. of water and filtered. The filter cake is washed with additional water, air dried and recrystallized from ethanol-water (1:2).

*Examples 2–33*

In the following examples, Example 1 is repeated using the indicated benzophenone compounds:

| Example: | Benzophenone compound |
|---|---|
| 2 | 2-methyl-. |
| 3 | 4-methyl-. |
| 4 | 3-chloro-. |
| 5 | 4-bromo-. |
| 6 | 4-cyano-. |
| 7 | 2-carboxy-. |
| 8 | 2-carbomethoxy-. |
| 9 | 2-carbethoxy-. |
| 10 | 2-carboxamido-. |
| 11 | 4-sulfamyl-. |
| 12 | 4-isopropyl-. |
| 13 | 4-n-octyl-. |
| 14 | 4-cyclohexyl-. |
| 15 | 3-phenyl-. |
| 16 | 2-allyl-. |
| 17 | 4-phenethyl-. |
| 18 | 2-hydroxy-. |
| 19 | 4-methoxy-. |
| 20 | 4-phenoxy-. |
| 21 | 2-acetoxy-. |
| 22 | 4-benzyloxy-. |
| 23 | 4,4'-dichloro-. |
| 24 | 2,4-dichloro-. |
| 25 | 2-bromo-2'-methyl-. |
| 26 | 2'-bromo-2,4,6-trimethyl-. |
| 27 | 2'-chloro-2'-methyl-. |
| 28 | 4,4'-diethyl-. |
| 29 | 2-fluoro-2'-methyl-. |
| 30 | 3,4-dimethyl-. |
| 31 | 2,5-dimethyl-. |
| 32 | 4,4'-dimethoxy-. |
| 33 | 4-(p-hydroxyphenyl)-. |

Examples 34–51

Each of the Examples 1–33 is repeated employing, however, the following α-cyano compounds:

Example: α-Cyano compound
- 34 ---- α-cyano-N,N-diethyl acetamide.
- 35 ---- α-cyano-N,N-di-n-propyl acetamide.
- 36 ---- α-cyano-N,N-diallyl acetamide.
- 37 ---- α-cyano-N,N-bis(β-chloroethyl) acetamide.
- 38 ---- α-cyano-N,N-bis(β-cyanoethyl) acetamide.
- 39 ---- α-cyano-N,N-bis(β-hydroxyethyl) acetamide.
- 40 ---- α-cyano-N,N-bis(methoxyethyl) acetamide.
- 41 ---- α-cyano-N,N-bis(ethoxyethyl) acetamide.
- 42 ---- α-cyano-N,N-bis(carbomethoxyethyl) acetamide.
- 43 ---- α-cyano-acetmorpholide (N-cyanoacetyl morpholine).
- 44 ---- α-cyanoacetpiperidide (N-cyanoacetyl piperidine).
- 45 ---- N-cyanoacetylpyrrole.
- 46 ---- N-cyanoacetyl pyrrolidone.
- 47 ---- N-cyanoacetyl indole.
- 48 ---- N-cyanoacetyl-α-methyl piperidine.
- 49 ---- N-cyanoacetyl imidazole.
- 50 ---- N-cyanoacetyl-1,2,3-oxathiazole.
- 51 ---- N-cyanoacetylbenzimidazole.
- 52 ---- α-cyano-N-methyl-N-ethyl acetamide.
- 53 ---- α-cyano-N-methyl-N-hydroxyethyl acetamide.

Example 54

One mole of the compound of Example 11 is reacted with six moles of ethylene oxide in an autoclave at 80° C. in the presence of 1% potassium hydroxide.

Example 55

Example 54 is repeated employing the compounds of the following examples with the indicated moles of alkylene oxide:

| Compound of example: | Moles of alkylene oxide |
| --- | --- |
| 18 | 4 ethylene oxide. |
| 18 | 5 propylene oxide. |
| 33 | 10 ethylene oxide. |
| 33 | 5 propylene oxide, then 12 ethylene oxide. |
| 39 | 8 ethylene oxide. |
| 39 | 4 butylene oxide. |

Example 56

The product of Example 1 is incorporated into a cellulose acetate film as follows:

0.375 g. product of Example 1
3.5 g. ethanol
6.5 g. methyl Cellosolve
9.0 g. ethyl acetate
26.0 g. cellulose acetate dope (3.75 g. cellulose acetate in 22 g. acetone)

The above is used to form a film by casting. Excellent stability to light of food packaged in the film is noted.

Example 57

To an epoxy resin mix of 2 parts Epon 828 (polymer of alkylene bis phenol and epichlorohydrin) and 1 part m-phenylene diamine there is added 5% by weight based on the weight of polymer of the compound of Example 1. The mass is then molded into a block at 120° C. for 24 hours. Upon exposure to ultra-violet light the block shows less color change than a similar block without the absorber.

Example 58

The products of Examples 2, 4, 6, 11, 19, 23 and 30 are employed as in Examples 54 and 55 with equally outstanding results.

Example 59

The product of Example 39 is used to prepare an oil-in-water emulsion employing 40 parts mineral oil, 2 parts product of Example 39 and 58 parts water. An emulsion stable, ultra-violet light stable product results.

The compounds of this invention are soluble in many diverse types of polymers, resins, waxes and the like, and therefore they are particularly suitable and adaptable for the stabilization of such materials as exemplified above. The nonoxyalkylated products are insoluble in water. Those compounds which contain lesser amounts of oxyalkyl groups, that is, up to about 4–6 groups per molecule, are in general less soluble in the non-polar solvents but are readily dispersible in water. The compounds containing larger amounts of alkylene oxide, that is, above about 6 moles thereof per mole of base compound, range from soluble in water with the solubility increasing as the number of oxyalkylene groups increases.

The ultraviolet absorbing compounds of the present invention may be used to stabilize all organic materials which are susceptible to ultraviolet degradation and are particularly useful in the stabilization of resins and plastics, whether they be in the form of films or molded products and either clear, opaque, semi-opaque or translucent. Foam, plastics and fibers are also admirably stabilized by these compounds. Pigments, polishes, creams, lotions, paints, enamels, varnish films and dyestuffs when susceptible to ultraviolet degradation have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope or spirit thereof.

We claim:

1. A compound of the formula:

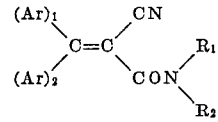

wherein $(Ar)_1$ and $(Ar)_2$ are phenyl nuclei devoid of nitro and nuclear-bonded amino groups and $R_1$ and $R_2$ are independently selected from the group consisting of alkyl of 1 to 30 carbon atoms, alkenyl of 3 to 25 carbon atoms and the atoms to complete a hetero ring with the nitrogen atom, said hetero ring being selected from the class consisting of mono- and bicyclic hetero nuclei.

2. A compound of the formula:

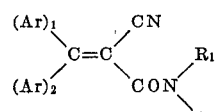

wherein $(Ar)_1$ and $(Ar)_2$ are phenyl nuclei devoid of nitro and nuclear-bonded amino groups and $R_1$ and $R_2$ are alkyl of from 1 to 30 carbon atoms.

3. A compound of the formula:

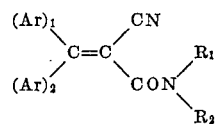

wherein $(Ar)_1$ and $(Ar)_2$ are phenyl nuclei devoid of nitro and nuclear-bonded amino groups and $R_1$ and $R_2$ are alkenyl of from 3 to 25 carbon atoms.

4. A compound of the formula:

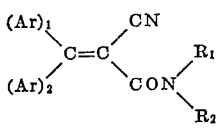

wherein (Ar)₁ and (Ar)₂ are phenyl nuclei devoid of nitro and nuclear-bonded amino groups and R₁ and R₂ form a heterocycle with the nitrogen atom, said heterocycle being selected from the group consisting of mono- and bicyclic heterocyclics.

5. A compound of the formula:

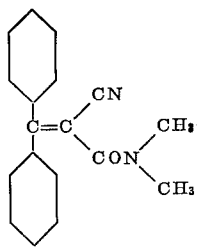

6. A compound of the formula:

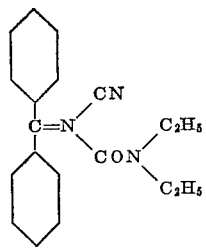

7. A compound of the formula:

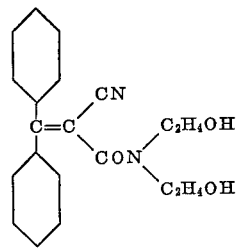

References Cited by the Examiner
UNITED STATES PATENTS

| | | | |
|---|---|---|---|
| 2,683,659 | 7/1954 | Schlesinger et al. | 260—329 X |
| 2,749,229 | 6/1956 | Ligett et al. | 260—465 X |
| 3,010,938 | 11/1961 | Spacht | 260—465 X |
| 3,079,366 | 2/1963 | Boyle et al. | 260—465 X |
| 3,081,280 | 3/1963 | Carlson | 260—465 X |

OTHER REFERENCES

Carrie et al.: Comptes Rendus, vol. 253, No. 18, pp. 1962–4, October 1961.

WALTER A. MODANCE, *Primary Examiner.*

NICHOLAS S. RIZZO, JOHN D. RANDOLPH,
*Examiners.*

R. PRICE, A. D. SPEVACK, *Assistant Examiners.*